3,042,490
THIONYL CHLORIDE-CARBONYL CHLORIDE REACTION PRODUCT

Thomas W. Sauls and Joseph J. Wimberly, College Park, Ga., assignors to Tennessee Corporation, New York, N.Y., a corporation of New York
No Drawing. Filed July 7, 1960, Ser. No. 41,253
2 Claims. (Cl. 23—174)

This invention relates to new chemical compounds and more particularly to a new composition produced as the reaction product of thionyl chloride and carbonyl chloride or phosgene.

It has been found that gaseous carbonyl chloride can be absorbed in liquid thionyl chloride in equi-molar proportions to form a new composition or complex having the empirical formula $CCl_4O_2S$. In its simplest form, the procedure consists merely in bubbling the gaseous carbonyl chloride or phosgene, a very volatile liquid having a boiling point of 7.6° C., through the thionyl chloride which is a liquid having a boiling point of 78.8° C. at a temperature of about 25–40° C. until one mole of phosgene has been absorbed. The reaction is mildly exothermic and a moderate amount of heat is generated as the phosgene is absorbed. The reaction product is a colorless liquid in the form of a thin fuming substance with a disagreeable odor, having the formula $Cl_2OS:COCl_2$.

As a specific example of the procedure stated generally above, 5.0 g. (0.042 mole) of pure thionyl chloride were placed in a vial having a solid rubber stopper and two hypodermic needles. Carbonyl chloride gas was then bubbled through the liquid slowly until the weight of the liquid had increased by 4.15 g. (0.042 mole $COCl_2$). The liquid became slightly warm during this reaction. It was a colorless, very thin, fuming substance with a disagreeable odor.

In general, the new composition thus produced can be used for effecting reactions involving one or more of the chemical groups therein, and various such uses will be apparent to those skilled in the art and/or will appear from time to time. By way of example of such uses, this composition has been found to be especially effective in very small amounts for the stabilization of liquid sulfur trioxide, as illustrated by the following tests:

Into heavy glass tubes were weighed 0.5, 0.25, and 0.06 g. of the new liquid composition, and to each was quickly added 50 g. of freshly distilled liquid sulfur trioxide. Precautions were taken to keep exposure to air and moisture to a minimum while sealing the tubes with an oxygen torch.

The contents of the tubes were mixed to give perfectly clear colorless solutions. They were frozen in an ice-bath and in a freezer chest at −15° C. for a number of times to determine the effectiveness of the stabilizer.

| Stabilizer | Number of freezings | Estimated percent polymer after melting at 25° C. |
|---|---|---|
| 0.5 g.—1% | [1] 10 | 0.1 |
| 0.25 g.—0.5% | [1] 10 | 0.2 |
| 0.06 g.—0.125% | 2 | 5–10 |

[1] Overnight.

As a comparison, a tube of liquid sulfur trioxide containing 1.0% of thionyl chloride alone was made up in the same manner, and after two freezings it had 5–10% polymer in it which continued to gradually grow at room temperature until the whole tube was filled with polymer.

On the other hand, the tubes in which the new composition of the present invention was used at the 1.0% and 0.5% levels had not increased in polymerization after two months standing at room temperature. The small amounts of polymer (0.1 and 0.2%) formed during the hard freezings were believed to have formed almost exclusively in the vapor space above the liquid.

It should also be noted that carbonyl chloride alone has no stabilizing effect at all on liquid sulfur trioxide, and that while thionyl chloride is a known stabilizer, it is generally accepted that it must be used at a level as high as 1.7% in order to obtain effective stabilization.

Thus the foregoing tests show that 0.5% of the new composition (equivalent to only 0.27% thionyl chloride) stabilized the liquid sulfur trioxide much more effectively than 1.0% thionyl chloride alone. Even when only 0.125% of the new composition was used (equivalent to only 0.07% thionyl chloride), a substantial stabilizing effect was obtained. On the other hand, the stabilizing effect obtained at 1.0% of the new composition is sufficient for all practical purposes, whereas the equivalent amount of thionyl chloride alone (about 0.5%) is ineffective.

It will be understood that the invention is not restricted to the details of the foregoing disclosure, and in particular that compositions embodying the invention can be used for any desired purpose other than the stabilization of liquid sulfur trioxide. Reference should be had to the appended claims for a definition of the limits of the invention.

What is claimed is:
1. A composition of matter consisting of the product of the reaction between one mole of $COCl_2$ and one mole of $SOCl_2$ at a temperature of 25°–40° C. under atmospheric pressure.
2. Stabilized liquid sulfur trioxide containing between 0.125% and 1.0% of the composition defined in claim 1.

References Cited in the file of this patent
UNITED STATES PATENTS

| 2,403,459 | Bollinson | July 9, 1946 |
| 2,664,443 | Horst | Dec. 29, 1953 |
| 2,856,266 | Beau | Oct. 14, 1958 |